(12) United States Patent
Min

(10) Patent No.: US 11,772,594 B2
(45) Date of Patent: Oct. 3, 2023

(54) VEHICLE ROOF AIRBAG WITH BINDING PARTS

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/563,111

(22) Filed: Dec. 28, 2021

(65) Prior Publication Data
US 2022/0212621 A1  Jul. 7, 2022

(30) Foreign Application Priority Data

Jan. 7, 2021 (KR) .................. 10-2021-0001931

(51) Int. Cl.
*B60R 21/214* (2011.01)
*B60R 21/201* (2011.01)

(52) U.S. Cl.
CPC .......... *B60R 21/214* (2013.01); *B60R 21/201* (2013.01)

(58) Field of Classification Search
CPC ... B60R 21/201; B60R 21/213; B60R 21/214; B60R 21/232; B60R 2021/23192
See application file for complete search history.

(56) References Cited

U.S. PATENT DOCUMENTS

| 7,083,188 B2 * | 8/2006 | Henderson | B60R 21/201 280/730.2 |
| 7,182,366 B2 * | 2/2007 | Enriquez | B60R 21/213 280/730.2 |
| 7,213,836 B2 * | 5/2007 | Coon | B60R 21/232 280/730.2 |
| 7,320,477 B2 * | 1/2008 | Kawabe | B60R 21/232 280/730.2 |
| 7,328,911 B2 * | 2/2008 | Chapman | B60R 21/217 280/730.2 |
| 7,547,038 B2 * | 6/2009 | Coleman | B60R 21/213 248/225.11 |
| 7,748,734 B2 * | 7/2010 | Wilmot | B60R 21/232 280/730.2 |

(Continued)

FOREIGN PATENT DOCUMENTS

JP  2011102102 A  *  5/2011
JP  2014080102 A  *  5/2014

(Continued)

*Primary Examiner* — Laura Freedman
(74) *Attorney, Agent, or Firm* — NovoTechIP International PLLC

(57) ABSTRACT

Proposed is an airbag for a vehicle, the airbag includes a cushion provided on a roof of the vehicle and deployed when gas is injected, first binding parts each formed in a structure protruding from the cushion and provided with a hole configured to bind with a bracket, first fixing parts each provided on the cushion and configured to wrap and fix the cushion, a bracket configured to support the cushion in combination with the cushion, and second binding parts each formed in a structure protruding from the bracket and provided with a hook to restrain the bracket and the cushion through the hole of a corresponding one of the first binding parts, so that the bracket supports the cushion.

5 Claims, 4 Drawing Sheets

(56) References Cited

U.S. PATENT DOCUMENTS

| | | | | |
|---|---|---|---|---|
| 7,823,914 | B2* | 11/2010 | Cheal | B60R 21/213 |
| | | | | 280/730.2 |
| 7,862,075 | B2* | 1/2011 | Minamikawa | B60R 21/217 |
| | | | | 280/728.2 |
| 7,976,055 | B2* | 7/2011 | Son | B60R 21/213 |
| | | | | 280/730.2 |
| 8,056,924 | B2* | 11/2011 | Hatfield | B60R 21/213 |
| | | | | 280/730.2 |
| 8,505,961 | B2* | 8/2013 | Jakobsson | B60R 21/232 |
| | | | | 280/730.2 |
| 8,573,638 | B2* | 11/2013 | Hayashi | B60R 21/214 |
| | | | | 280/730.2 |
| 8,770,619 | B2* | 7/2014 | Nakamura | B60R 21/217 |
| | | | | 280/730.2 |
| 9,139,151 | B2* | 9/2015 | Beppu | B60R 21/213 |
| 9,487,175 | B2* | 11/2016 | Noma | B60R 21/214 |
| 9,555,761 | B2* | 1/2017 | Gilles | B60R 21/2334 |
| 9,580,036 | B2* | 2/2017 | Choi | B60R 21/213 |
| 10,322,692 | B2* | 6/2019 | Ma | B60R 21/213 |
| 10,471,924 | B2* | 11/2019 | Min | B60R 21/214 |
| 10,596,990 | B2* | 3/2020 | Sato | B60R 21/237 |
| 10,974,682 | B2* | 4/2021 | Iwata | B60R 21/237 |
| 11,040,690 | B2* | 6/2021 | Montgomery | B60R 21/232 |
| 11,192,518 | B2* | 12/2021 | Kang | B60R 21/213 |
| 11,220,232 | B2* | 1/2022 | Kim | B60R 21/217 |
| 11,267,422 | B2* | 3/2022 | Schmid | B60R 21/213 |
| 11,305,719 | B2* | 4/2022 | Cho | B60R 21/217 |
| 11,370,379 | B2* | 6/2022 | Abelenda Alcalde | |
| | | | | B60R 21/232 |
| 2008/0238052 | A1* | 10/2008 | Iida | B60R 21/201 |
| | | | | 280/730.1 |
| 2022/0055567 | A1* | 2/2022 | Kato | B60R 21/232 |
| 2022/0297627 | A1* | 9/2022 | Kim | B60R 21/201 |
| 2022/0355757 | A1* | 11/2022 | Kim | B60R 21/232 |

FOREIGN PATENT DOCUMENTS

| | | | |
|---|---|---|---|
| JP | 2015067013 A | * | 4/2015 |
| JP | 2015123763 A | * | 7/2015 |
| KR | 20180067355 A | | 6/2018 |

* cited by examiner

VEHICLE ROOF AIRBAG WITH BINDING PARTS

CROSS-REFERENCE TO RELATED APPLICATIONS

The present application claims priority to Korean Patent Application No. 10-2021-0001931, filed Jan. 7, 2021, the entire contents of which is incorporated herein for all purposes by this reference.

BACKGROUND OF THE INVENTION

1. Field of the Invention

The present invention relates to an airbag for a vehicle and, more particularly, to a structure of an airbag for a vehicle, the structure being applicable to a sunroof of the vehicle and capable of facilitating both a packing process of the airbag and an assembly process of the airbag to the sunroof.

2. Discussion of Related Art

Recently, a panoramic roof and the like in which a roof of a vehicle may be partially opened according to preferences of consumers are being installed, giving drivers and passengers a sense of openness and helping to ventilate the vehicle.

However, when a vehicle accident occurs, a driver or occupant may be thrown out of the vehicle through the open sunroof, resulting in an accident, and when the vehicle rolls over, the driver or occupant may be hit with the sunroof and may suffer bodily harm.

A sunroof airbag is deployed to a sunroof side of a vehicle when an accident occurs to prevent a person from colliding with the sunroof or being thrown out of the sunroof and, therefore, is essential for the vehicle in which the sunroof is installed.

FIG. 1 shows views illustrating an assembly process of a conventional sunroof airbag module. Conventionally, after forming the folding pack 10 including a cushion folded therein as shown in FIG. 1, taping 20 is performed to fix the folding pack not to come loose, and when assembling the folded cushion to the bracket 30, a removal process of the taping was performed.

In the above process, the overall process efficiency is lowered due to the taping and the removal process of the taping, and even after assembling the folded cushion to the bracket, the cushion and the bracket are not fixed well, so the folded cushion moves up, down, left, and right. Accordingly, there was a problem in that it was difficult to mount the airbag module to the sunroof.

The foregoing is intended merely to aid in the understanding of the background of the present invention and is not intended to mean that the present invention falls within the purview of the related art that is already known to those skilled in the art.

BRIEF SUMMARY OF THE INVENTION

Accordingly, the present invention has been made keeping in mind the above problems occurring in the related art, the present invention is intended to provide an airbag for a vehicle including a first fixing part configured to fix a folded cushion, and a first binding part and a second binding part configured to fix the cushion to a bracket.

In order to achieve the above objective, there may be provided an airbag for a vehicle according to the present invention, the airbag including: a cushion provided on a roof of the vehicle and deployed when gas is injected; first binding parts each formed in a structure protruding from the cushion and provided with a hole configured to bind with a bracket; first fixing parts each provided on the cushion and configured to wrap and fix the cushion; a bracket configured to support the cushion in combination with the cushion; and second binding parts each formed in a structure protruding from the bracket and provided with a hook to restrain the bracket and the cushion through the hole of an associated one of the first binding parts so that the bracket supports the cushion.

The first binding parts may be formed at opposite ends of the cushion, respectively, and the second binding parts may be formed at opposite ends of the bracket to face the first binding parts, respectively.

The first fixing parts may be formed at opposite ends of the cushion so as to be located on sides of the first binding parts, respectively.

Each of the first fixing parts may be provided with a slit at one end thereof, and each of the first fixing parts wrapping the cushion may fix the cushion with the slit passing through an associated one of the first binding parts.

The bracket may be provided with second fixing parts to wrap and may fix the cushion and the bracket.

The bracket may be provided with second fixing parts to wrap and may fix the cushion and the bracket, and the second fixing parts may be formed at opposite ends of the bracket to be each located on a side of an associated one of the second binding parts.

Each of the second fixing parts may be provided with a slit at one end thereof, and each of the second fixing parts wrapping the cushion and the bracket may fix the cushion and the bracket with a slit passing through an associated one of the second binding parts.

As described above, according to an airbag for a vehicle of the present invention, efficiency of an assembly process of the sunroof airbag is improved, and an effect of facilitating assembling the airbag to the sunroof is realized.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinafter, an embodiment of the present invention for solving the above objective and problems will be described with reference to the drawings. On the other hand, when a detailed description of a known technology in the related art in understanding the present invention is not helpful in understanding a core content of the present invention, the description will be omitted, and the technical spirit of the present invention is not limited thereto and may be variously implemented by being changed by those skilled in the art.

Specifically, a present airbag for a vehicle is installed on a sunroof of the vehicle and serves to prevent a vehicle occupant from colliding with the sunroof or being thrown out of the sunroof when an accident occurs.

The sunroof airbag is installed on the sunroof after a folding pack 10 of a cushion is coupled to a bracket 30. In order to assemble the sunroof airbag to the sunroof, the following process is performed.

Figure 1:
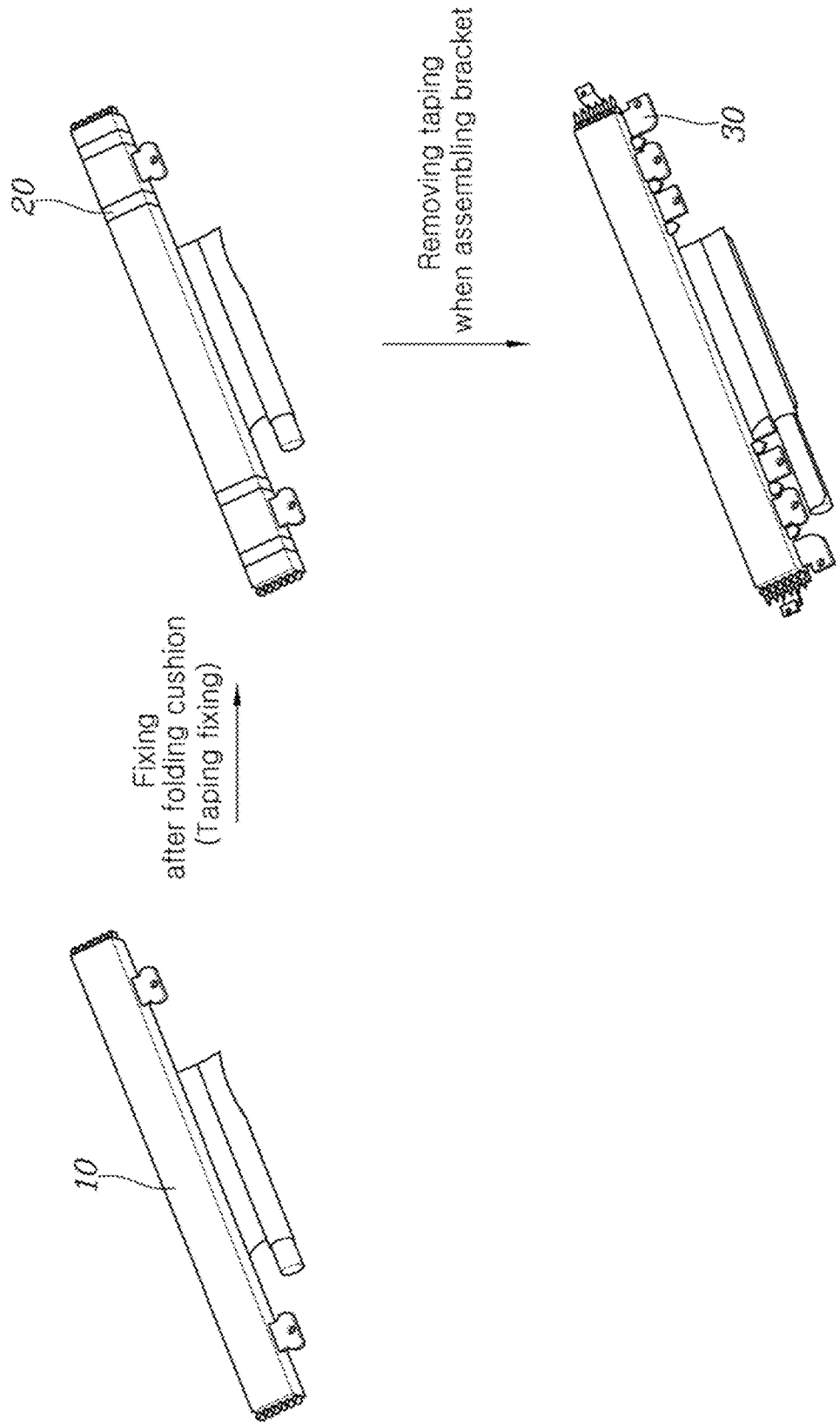
FIG. 1 is a view illustrating an assembly process of a conventional sunroof airbag module.

With reference to FIG. 1, a sunroof airbag module according to a related art is installed through an assembly process that includes a process of folding a cushion, a process of taping to fix the folded cushion, an assembly process of the folded cushion and bracket, a removal process of the taping of the cushion, and an assembly process of the completed airbag module on the sunroof.

However, there is a problem in that overall process efficiency is reduced due to the process of taping the cushion and the removal process of the taping during the above process.

In addition, the cushion may not be completely fixed to the bracket after the folded cushion is assembled on the bracket, so the cushion moves up, down, left, and right, so that it is difficult to assemble the airbag module on the sunroof.

The present invention is to solve such a process problem, and an airbag for a vehicle according to the present invention for achieving the above objective includes: a cushion 100 provided on a roof of the vehicle and deployed when gas is injected; first binding parts 110 each formed in a structure protruding from the cushion and provided with a hole 111 configured to bind with a bracket 200; first fixing parts 120 each provided on the cushion and configured to wrap and fix the cushion; the bracket 200 configured to support the cushion in combination with the cushion; and second binding parts 210 each formed in a structure protruding from the bracket and provided with a hook to restrain the bracket and the cushion through the hole 111 of a corresponding one of the first binding parts so that the bracket supports the cushion.

Figure 2:
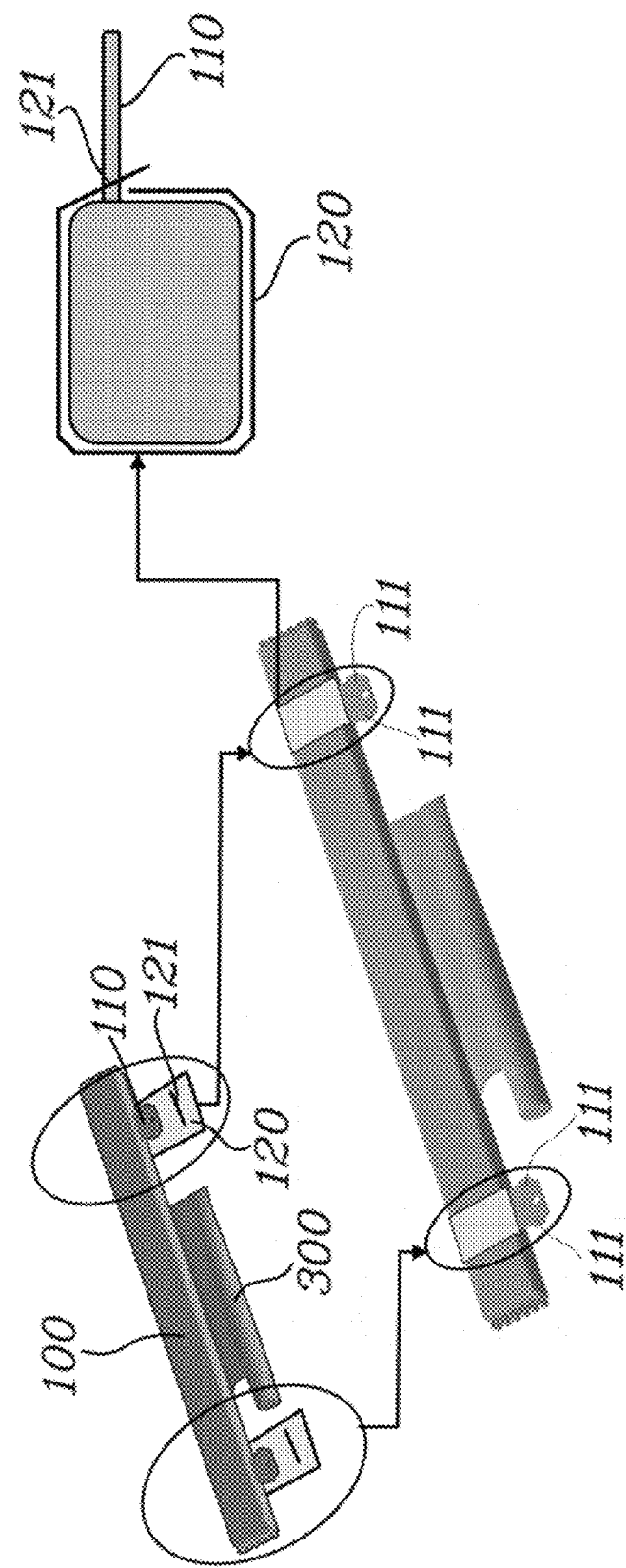
FIG. 2 is a view illustrating a cushion of an airbag for a vehicle according to an embodiment of the present invention.
Figure 3:
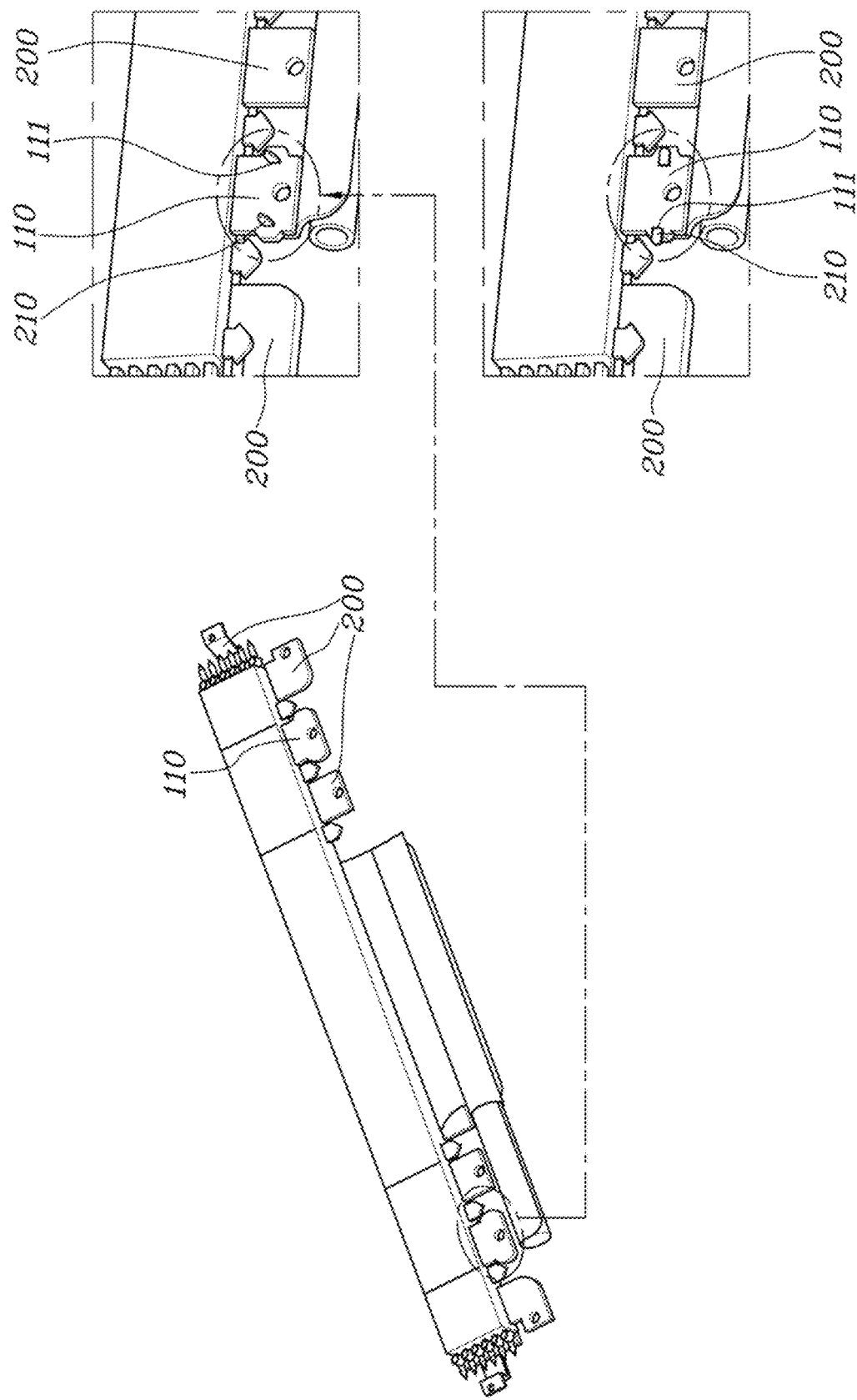
FIG. 3 is a view illustrating the cushion and a bracket of the airbag for a vehicle according to the embodiment of the present invention.

FIG. 2 is a view illustrating the cushion of an airbag for a vehicle according to an embodiment of the present invention, and FIG. 3 is a view illustrating the cushion and the bracket of the airbag for a vehicle according to the embodiment of the present invention. With reference to FIGS. 2 and 3, the cushion 100 used for the airbag is formed by overlapping the fabric used for the cushion up and down and then sewing and is deployed by receiving gas from the inflator 300. The cushion 100 is folded to reduce the volume in order to be installed inside the vehicle, and in order to prevent the folded cushion 100 from being unwound, the first fixing parts 120 are provided to wrap and fix the cushion. At this time, the first fixing parts 120 do not need to be removed like conventional taping, may be made of a material such as a non-woven fabric, and may each include a tear line to be easily torn when the cushion is deployed.

As shown in FIG. 2, the folded cushion 100 may be fixed so as not to be released by being wrapped using the first fixing parts 120.

On the other hand, the cushion 100 is provided with the first binding parts 110 and able to be assembled to the bracket 200.

Specifically, the second binding parts 210 provided on the bracket 200 and the first binding parts 110 may be coupled to each other, respectively, thereby allowing the bracket 200 to restrain the cushion 100.

With reference to FIG. 3, the second binding parts 210 of the bracket penetrate through the holes 111 formed in the first binding part 110, respectively, and the second binding parts 210 are each bent in opposite sideways so as not to be removed from the first binding part 110.

In this way, the folded cushion 100 may be fixed so that it does not move up, down, left, and right on the bracket 200. Accordingly, there is an effect of enabling the airbag module to be conveniently assembled to the sunroof.

With reference to FIG. 2, the first binding parts 110 may include a pair of the first binding parts positioned at both ends of the cushion 100, respectively, and with reference to FIG. 3, the second binding parts 210 may include a pair of the second binding parts 210 positioned at both ends of the bracket 200, respectively, to face the first binding parts 110, respectively.

Since the cushion 100 is fixed at both ends, the cushion may be strongly supported by the bracket 200, thereby being prevented from moving in the bracket 200.

The first fixing parts 120 may include a pair of first fixing parts 120 positioned at both ends of the cushion 100, respectively, so as to be located on sides of the first binding parts 110 located at both ends of the cushion, respectively.

Through this, the folded cushion 100 may be stably fixed, and the more plurality of the first fixing parts 120 is formed, the more stably the cushion may be fixed. In particular, when a plurality of the first fixing parts 120 is formed, it is necessary to form a plurality of tear lines of each of the first fixing parts 120. In this case, the fixing ability is improved, and it does not interfere with the development of the cushion when the number of the tear lines is sufficient even in the case the plurality of the first fixing parts is formed.

The first fixing parts 120 are each provided with a slit 121 at one end thereof, and the first fixing parts 120 wrapping the cushion may each fix the cushion with each of the slits 121 passing through a corresponding one of the first binding parts.

After wrapping the cushion, the first fixing parts 120 may each fix the cushion by joining a finishing end to a starting end thereof. However, after wrapping the cushion the first fixing parts 120 may fix the cushion by forming the slits at an end thereof, respectively, in such a manner that each of the first binding parts is allowed to be passed through a corresponding one of the slits 121 and to be hooked thereto.

Figure 4:
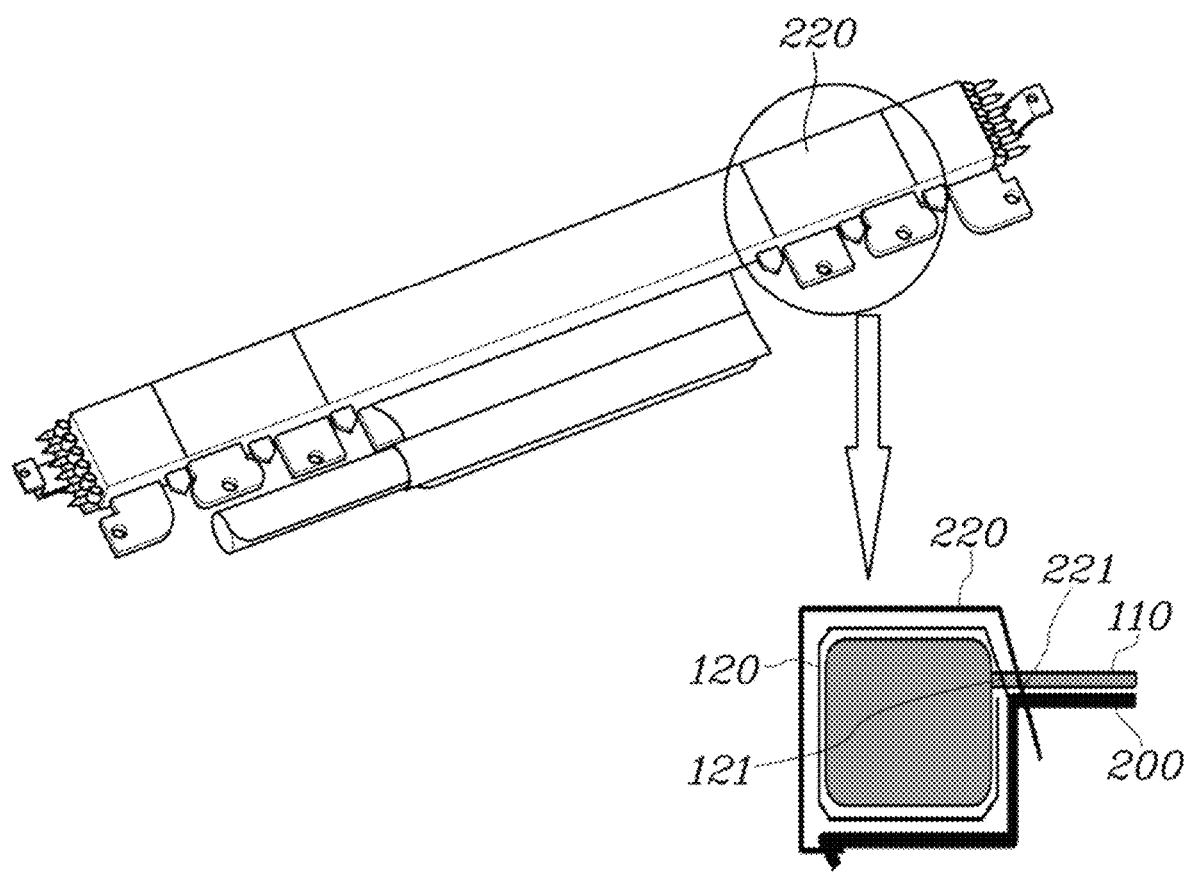
FIG. 4 is a view illustrating an airbag module for a vehicle according to another embodiment of the present invention.

Meanwhile, FIG. 4 is a view illustrating an airbag module for a vehicle according to another embodiment of the present invention, and another embodiment will be described with reference to FIG. 4.

A bracket 200 may be provided with second fixing parts 220 configured to wrap and fix a cushion 100 and the bracket 200, and the second fixing parts 220 may include a pair of second fixing parts 220 at both ends of the bracket, respectively, to be each located on a side of a corresponding one of the second binding parts 210. In addition, a slit is provided at one end of each of the second fixing parts 220, so the second fixing parts 220 wrapping the cushion and the bracket may fix the cushion and the bracket with the slits each passing through a corresponding one of the second binding parts 210.

Specifically, the second fixing parts 220 serve to wrap and fix the cushion 100 and the bracket 200 together. Secondarily, the second fixing parts 220 fix the cushion 100 and the bracket 200, and as the second fixing parts 220 are provided, the cushion 100 and the bracket 200 may be more strongly bound to each other, thereby allowing the airbag module to be more conveniently assembled to the sunroof.

In this case, the second fixing parts 220 may be a non-woven material like first fixing parts 120 and may be each formed with a tear line. Accordingly, as the tear line is cut when the cushion is deployed, the deployment of the cushion 100 may not be disturbed.

In addition, the second fixing part 220 may be formed on a side of the second binding part 210 of the bracket, and when the second binding parts 210 are provided at opposite ends of the bracket, the second fixing parts 220 may also be provided on opposite sides of the second binding parts, that is, at both ends of the bracket, respectively.

The second fixing parts 220 may be each formed with a slit at one end like the first fixing part 120, and after wrapping the cushion and the bracket, the second fixing parts 220 may each fix the cushion 100 and the bracket 200 by allowing the slit formed therein to pass through the first binding part 110.

Although shown and described with respect to specific embodiments of the present invention, it will be obvious to those of ordinary skill in the art that the present invention may be variously improved and changed without departing from the spirit of the present invention provided by the following claims.

What is claimed is:

1. An airbag for a vehicle, comprising:
  a cushion positioned at a roof of the vehicle and configured to deploy when gas is injected thereto;
  a bracket attached to and longitudinally extending along the cushion;
  a plurality of first binding parts protruding from the cushion, each first binding part having a hole;
  a plurality of first fixing parts provided corresponding to the plurality of first binding parts, respectively, each first fixing part wrapping around the cushion and engaged with a corresponding first binding part; and
  a plurality of second fixing parts spaced apart from each other, each second fixing part wrapping around the cushion and bracket,
  wherein the bracket integrally includes a plurality of second binding parts respectively positioned corresponding to the plurality of first binding parts, each second binding part having a hook extending through the hole of the corresponding first binding part, and
  wherein the plurality of second fixing parts are respectively disposed corresponding to the plurality of second binding parts.

2. The airbag of claim 1, wherein:
  the cushion has first and second portions spaced apart from each other, and the plurality of first binding parts comprises (1) a first part disposed at the first portion of the cushion and (2) a second part disposed at the second portion of the cushion, and
  the bracket has first and second portions spaced apart from each other, and the plurality of second binding parts comprises (1) a first part disposed at the first portion of the bracket and facing the first part of the first binding parts and (2) a second part disposed at the second portion of the bracket and facing the second part of the first binding parts.

3. The airbag of claim 2, wherein the plurality of first fixing parts comprises:
  a first part wrapping around the first portion of the cushion and coupled to the first part of the first binding parts; and
  a second part wrapping around the second portion of the cushion and coupled to the second part of the first binding parts.

4. The airbag of claim 3, wherein:
  each first fixing part has one end at which a slit is positioned, and
  each first binding part extends through the slit of the first fixing part provided corresponding to the first binding part.

5. The airbag of claim 1, wherein:
  each second fixing part has one end at which a slit is disposed, and
  each second binding part extends through the slit of the corresponding second fixing part.

* * * * *